United States Patent [19]
Bardon et al.

[11] Patent Number: 6,025,838
[45] Date of Patent: Feb. 15, 2000

[54] INTERACTIVE DISPLAY INTERFACE FOR MEDIA PRESENTATION WITH DIRECT ACCESS TO MEDIA SEQUENCES

[75] Inventors: Didier Daniel Claude Bardon, Austin; Richard Edmond Berry, Georgetown; Shirley Lynn Martin, Austin; Scott Anthony Morgan, Austin; John Martin Mullaly, Austin; Craig Ardner Swearingen, Austin, all of Tex.

[73] Assignee: International Business Machines Corporation, Armonk, N.Y.

[21] Appl. No.: 08/893,751

[22] Filed: Jul. 11, 1997

[51] Int. Cl.[7] .............................. G06F 3/14; G11B 27/10
[52] U.S. Cl. ........................ 345/328; 345/349; 345/970; 345/974; 369/33
[58] Field of Search ................................ 345/328, 352, 345/302, 348, 349, 970, 354, 974; 386/55, 52; 369/30, 33, 98

[56] References Cited

U.S. PATENT DOCUMENTS

| | | | |
|---|---|---|---|
| 4,675,755 | 6/1987 | Baumeister et al. | 386/52 |
| 5,388,197 | 2/1995 | Rayner | 345/328 |
| 5,416,895 | 5/1995 | Anderson et al. | 345/350 X |
| 5,442,795 | 8/1995 | Levine et al. | 345/349 |
| 5,461,708 | 10/1995 | Kahn | 345/440 |
| 5,463,724 | 10/1995 | Anderson et al. | 707/503 |
| 5,502,805 | 3/1996 | Anderson et al. | 345/340 X |
| 5,581,670 | 12/1996 | Bier et al. | 345/146 X |
| 5,581,678 | 12/1996 | Kahn | 345/440 |
| 5,590,259 | 12/1996 | Anderson et al. | 707/503 |
| 5,594,899 | 1/1997 | Knudsen et al. | 707/2 |
| 5,696,919 | 12/1997 | Masuno et al. | 345/354 |
| 5,732,184 | 3/1998 | Chao et al. | 386/55 |
| 5,794,249 | 8/1998 | Orsolini et al. | 345/328 X |
| 5,903,264 | 5/1999 | Moeller et al. | 345/974 X |

*Primary Examiner*—Raymond J. Bayerl
*Attorney, Agent, or Firm*—Jerry Kraft; Volel Emile

[57] ABSTRACT

A computer supported display control system for switching between and tracking of sequences in electronic media presentations having multisequences. During switching, the selected tracks or sequences may be accessed directly and the tracking is persistent and continual through a graphic scale of positions adjacent to and respectively corresponding to each sequence in a list of such sequences. The position of the current sequence is tracked by an indicator which is on the scale.

12 Claims, 6 Drawing Sheets

INTERACTIVE DISPLAY INTERFACE FOR MEDIA PRESENTATION WITH DIRECT ACCESS TO MEDIA SEQUENCES

COPENDING APPLICATIONS

Copending applications: "INTERACTIVE DISPLAY INTERFACE FOR MEDIA PRESENTATION", D. Bardon et al. Ser. No. 08/836,154 filed May 23, 1997 and "INTERACTIVE DISPLAY INTERFACE FOR MEDIA PRESENTATION HAVING SIMPLIFIED CONTROLS", S. Martin et al. Ser. No. 08/892,394 filed Jul. 14, 1997 both relate to controlling electronic presentations via interactive computer controlled interfaces.

TECHNICAL FIELD

The present invention relates to user interactive computer supported display technology and particularly to such user interactive systems and methods which are user friendly, i.e. provide even noncomputer literate users with an interface environment which is easy to use and intuitive. More particularly, the present invention relates to display interfaces for electronic media presentations as well as for the editing of such presentations.

BACKGROUND OF THE INVENTION

The 1990's decade has been marked by a societal technological revolution driven by the convergence of the data processing industry with the consumer electronics industry. This advance has been even further accelerated by the extensive consumer and business involvement in the internet over the past two years. As a result of these changes, it seems as if virtually all aspects of human endeavor in the industrialized world requires human computer interfaces. As a result of these profound changes, there is a need to make computer directed activities accessible to a substantial portion of the world's population which, up to a year or two ago, was computer illiterate, or at best computer indifferent. In order for the vast computer supported market places to continue and be commercially productive, it will be necessary for a large segment of computer indifferent consumers to be involved in computer interfaces. Thus, the challenge of our technology is to create interfaces to computers which are as close to the real world as possible.

One major market for user friendly computer controlled display interfaces has been in the selection and delivery of a variety of electronic media presentations which is part of the multimedia marketplace. In the media presentation product fields, it is very important to provide viewers or users with on-screen controls for making and editing various media presentations. These controls must be easy to use. As the functions available to interactive display users to control electronic media increases, the complexity of the display screens would be expected to increase. The display interface technology is continually seeking new implementations which simplify display interfaces in order to offset the increased complexity brought about by increased function.

SUMMARY OF THE INVENTION

The present invention provides access to and control of the stored content of an electronic media presentation through a data processor controlled display interface which is very user friendly. This interface is particularly directed to the control of media presentations made up of a plurality of subpresentations or sequences. The present invention provides an effective interface for directly accessing each of such sequences and for keeping track of the user's position with respect to these sequences.

Means are provided for displaying a list of the media sequences in the presentation. A graphic scale representative of a plurality of positions, each respectively corresponding to one of the sequences is displayed in association with the list. User interactive means are provided for directly selecting one of the sequences by placing a graphical indicator at the position corresponding to the sequence. Also, there are means for maintaining the indicator at the selected position until another media sequence is selected. Among the electronic presentations to which the invention applicable are video, audio as well as photographic presentations comprising sequences of still photographs.

DETAILED DESCRIPTION OF THE PREFERRED EMBODIMENT

The preferred embodiment will be described as used within a three-dimensional virtual environment. However, it should be understood that the present invention could be practiced within a more conventional two-dimensional windows-like environment.

Copending application, "INTERACTIVE DISPLAY INTERFACE FOR MEDIA PRESENTATION", D. Bardon et al. (Attorney Number AT9-97-050), filed May 23, 1997, and assigned to the assignee of the present invention covers a computer controlled three dimensional display interface for controlling electronic media presentations. The direct access display system of the presentation may be used in the mouse or other input driven on-screen control system described in that application.

Before going into the details of the specific embodiments, it should be helpful to understand from a more general perspective the three-dimensional workspace with respect to which the present invention is described. The three-dimensional workspace is a workspace that is perceived as extending in three orthogonal directions. Typically a display has a two-dimensional display surface and the perception of a third dimension is effected by visual clues such as perspective lines extending toward a vanishing point.

While the three-dimensional embodiments used to illustrate the present invention can be implemented using object oriented techniques involving the C++ programming language, we found it preferable to use SCL as used in VRT: the Virtual Reality Toolkit developed and marketed by Superscape Ltd. having U.S. offices in Palo Alto, Calif. Extensive details of these programming techniques may be found in the Superscape VRT, Reference Manual, Version 4-00, 2d Edition, Jan. 29, 1996.

It should be understood by those skilled in the art that object oriented programming techniques used in creating the three-dimensional background environment as well as the objects of the present invention involve the definition, creation, use and instruction of "objects". These objects are software entities comprising data elements and routines, or methods, which manipulate the data elements. The data and related methods are treated by the software as an entity and can be created, used and deleted as such. The data and functions enable objects to model their real world equivalent entity in terms of its attributes, which can be presented by the data elements, and its behavior which can be represented by its methods.

Figure 1:
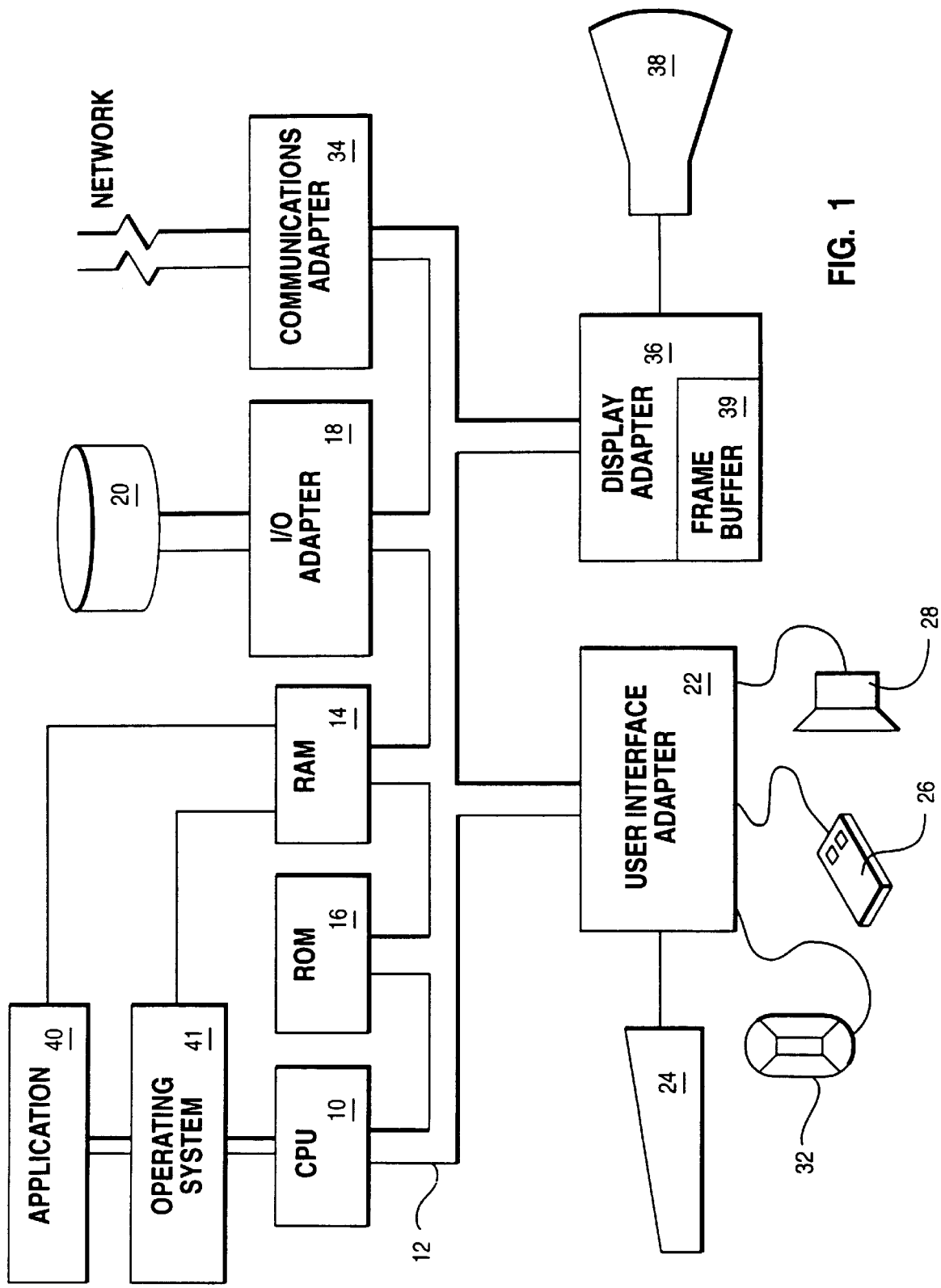
FIG. 1 is a block diagram of a data processing system including essential processing unit which is capable of implementing the present invention.

Referring to FIG. 1, a typical data processing system is shown which may be used in conjunction with object oriented software in implementing the environment of the present invention. A central processing unit (CPU), such as one of the PowerPC microprocessors available from International Business Machines Corporation (PowerPC is a trademark of International Business Machines Corporation) is provided and interconnected to various other components by system bus 12. An operating system 41 runs on CPU 10 and provides control and is used to coordinate the function of the various components of FIG. 1. Operating system 41 may be one of the commercially available operating systems such as DOS, or the OS/2 operating system available from International Business Machines Corporation (OS/2 is a trademark of International Business Machines Corporation). A program application such as the program in the above-mentioned VRT platform 40 runs in conjunction with operating system 41 and provides output calls to the operating system 41 which implements the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and application 40 are loaded into RAM 14 which is the computer system's main memory. I/O adapter 18 may be a small computer system interface (SCSI) adapter that communicates with the disk storage device 20, i.e. a hard drive. Communications adapter 34 interconnects bus 12 with an outside network enabling the data processing system to communicate with other such systems over a local area network (LAN), wide area network (WAN), or the like. I/O devices are also connected to system bus 12 via user interface adapter 22 and display adapter 36. Keyboard 24, trackball 32, mouse 26 and speaker 28 are all interconnected to bus 12 through user interface adapter 22. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the trackball 32 or mouse 26 and receiving output information from the system via speaker 28 and display 38. Such a trackball, mouse or other pointing means may be used to directly access and activate selected media sequences. Likewise, this direct access may be made through appropriate touch screen displays.

There will now be described a simple illustration of the present invention. When the images are described, it will be understood that these may be rendered by storing a virtual reality three-dimensional image creation program such as the previously described VRT of Superscape in the RAM 14 of the system of FIG. 1. Also stored on the RAM will be a suitable operating system such as DOS or Windows. The operating system of the VRT application is diagrammatically shown in FIG. 1 as operating system 41 and the VRT program is part of application 40.

Figure 2:
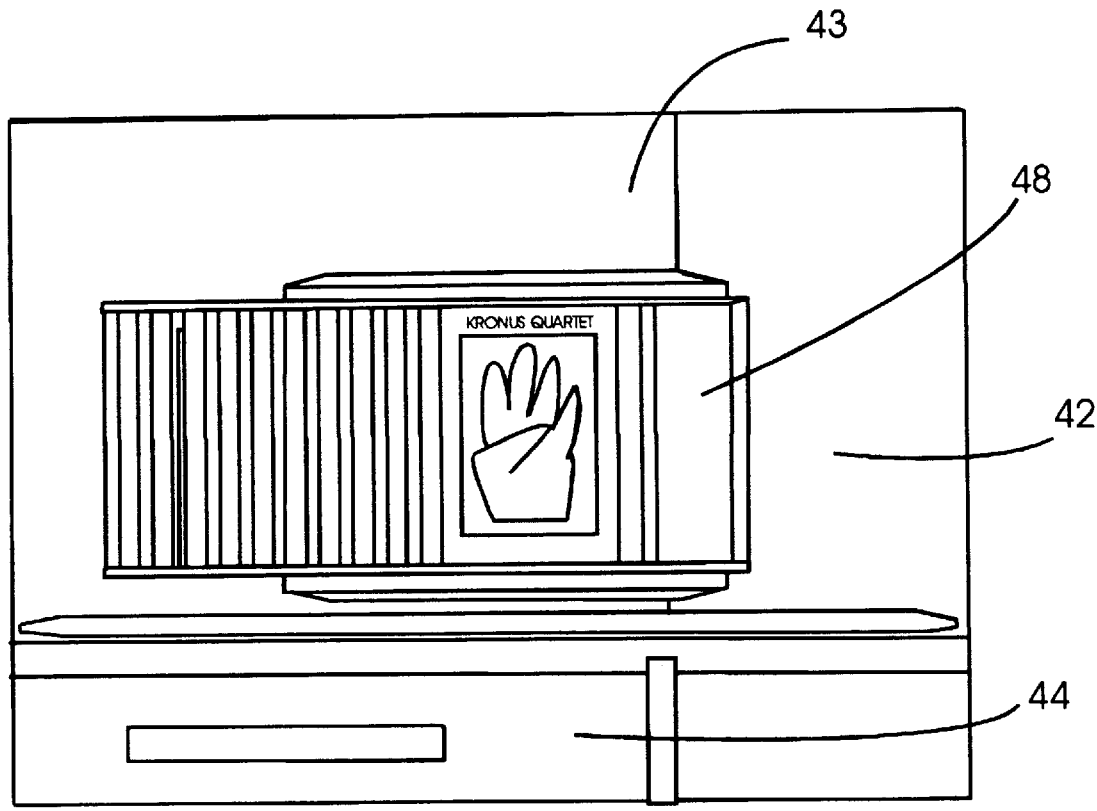
FIG. 2 shows a typical three-dimensional workplace embodiment of a portion of a media entertainment center within which the present invention may be implemented.

The present invention will now be explained in detail using for an initial example, an audio CD presentation system such as that described in the above mentioned applications, "INTERACTIVE DISPLAY INTERFACE FOR MEDIA PRESENTATION", Bardon et al. (Attorney Docket No. AT9-97-050) or in "INTERACTIVE DISPLAY INTERFACE FOR MEDIA PRESENTATION HAVING SIMPLIFIED CONTROLS", Martin et al. (Attorney Docket No. AT9-97-279). The system for controlling the CD presentations in these copending application are described within the context of a virtual reality three-dimensional workspace such as the one shown in FIG. 2 herein. The workspace 42 is shown as an image of an entertainment center, a portion of which, 43 is shown. Viewpoint interface 44 which is presented to the viewer on display monitor 38 of FIG. 1. In accordance with conventional techniques, the user may control the viewpoint 44 through a conventional I/O device such as mouse 26 of FIG. 1 which operates through user interface 22 to call upon VRT programs in RAM 14 cooperating with the operating system 41 to create the images in frame buffer 39 of display adapter 36 to control the display on monitor 38. Using conventional virtual three-dimensional workspace navigation techniques, the viewpoint interface of the user shown in FIG. 2 is changeable as the user moves closer or backs away from objects in the workspace or moves to the right or left. All this may be controlled by a suitable I/O device such as mouse 26 of FIG. 1.

Figure 3:
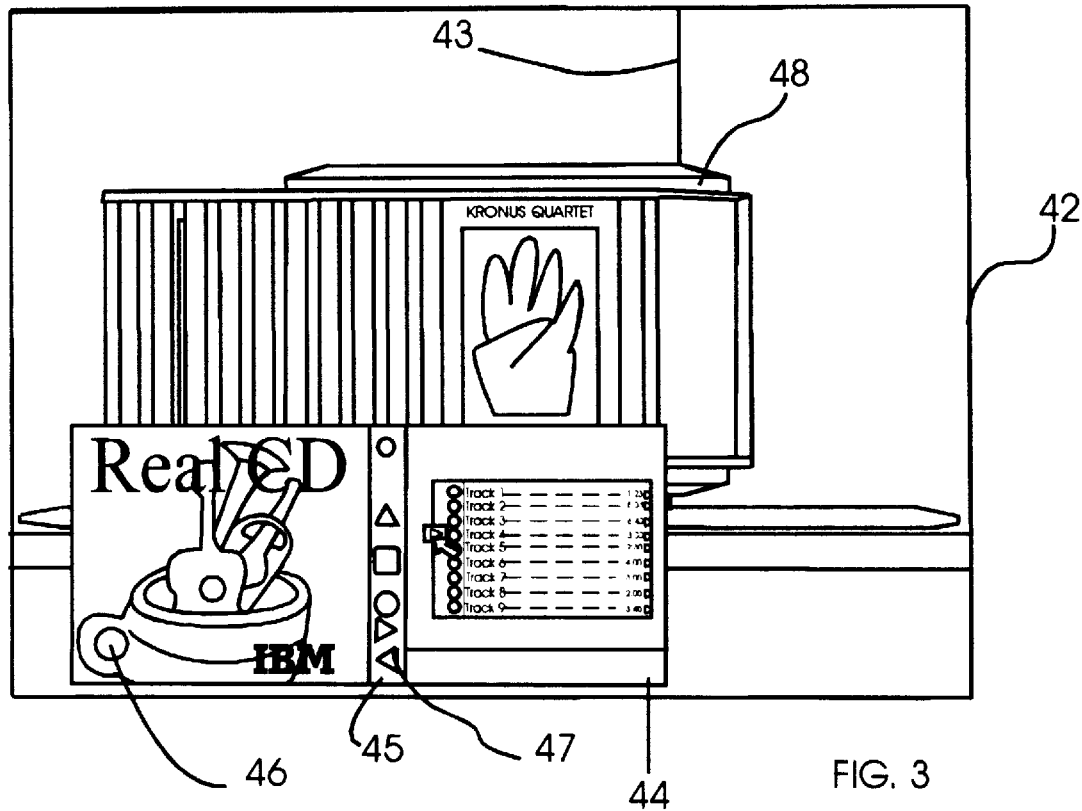
FIG. 3 shows the workplace portion of FIG. 2, after the control system of the present invention has been activated.

The entertainment center also includes a CD library in the form of CD carousel 48 from which the user operating with conventional selection pointing techniques, has browsed through the carousel to select a desirable CD to play. Once he makes the appropriate selection of the object in accordance with these copending application, the selected CD appears as shown in FIG. 3. The CD control image 45, contains a realistic image of the CD jacket 46 as well as all of the controls 47 necessary to run the CD audio presentation.

Figure 4A:
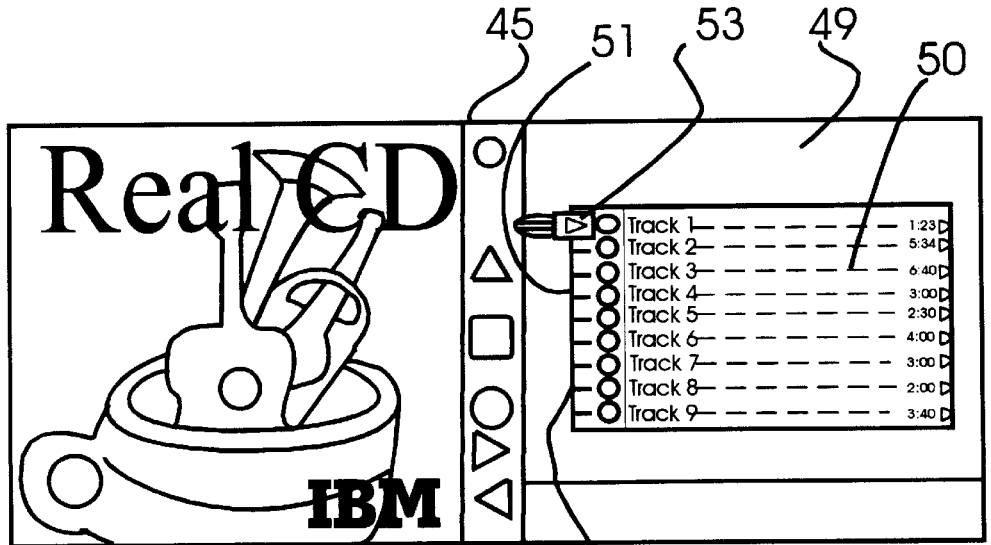
FIGS. 4A through 4D are representations of the displayed audio CD presentation controls during a switching operation audio sequences or tracks.
Figure 4B:
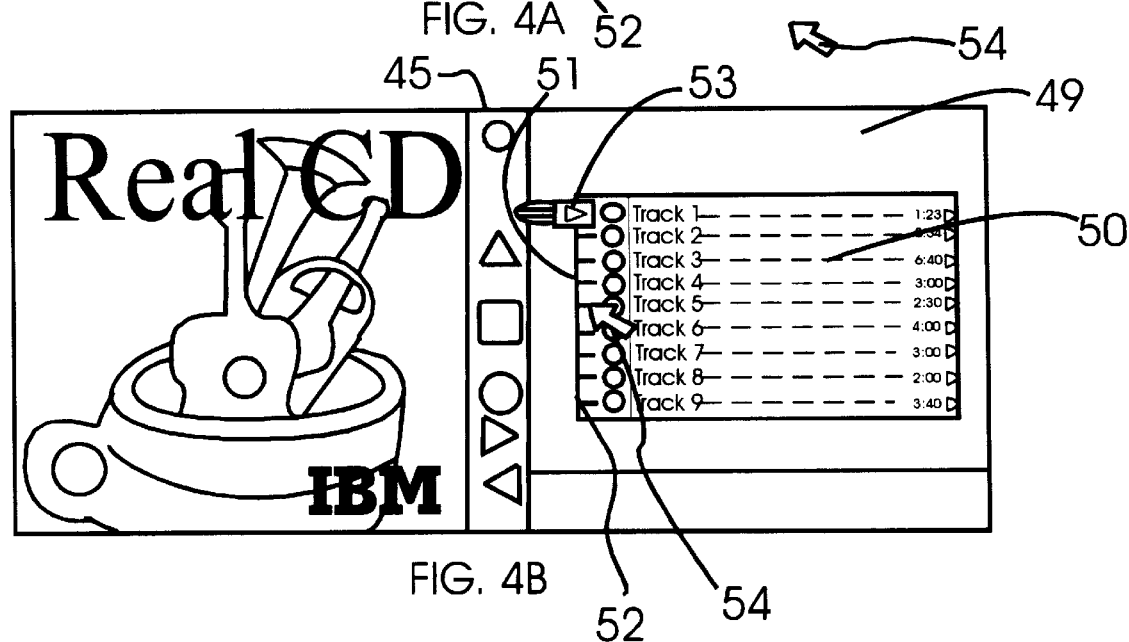

The specifics of the present invention will now be described with respect to FIGS. 4A through 4D which show the CD control image 45 of FIG. 3 in several states as the steps involved in the present invention are illustrated. The present invention involves the track control panel 49 shown in FIGS. 4A through 4D. With reference first to FIG. 4A, the control panel 49 contains a list 50 of the nine musical tracks in the stored musical presentation represented by CD 45. It also contains a graphic scale 51 having nine positions 52 each corresponding to one of the nine musical tracks in the presentation. Indicator 53 which moves up and down along scale 51 serves to indicate the current position, i.e. the current sequence of track which is being played or presented in the current presentation. The user or viewer of the system may readily change from one track to another directly through the use of a pointer or cursor 54. This pointer may be directly and interactively controlled through any conventional control device such as mouse 26 or trackball 32 in FIG. 1.

Figure 4C:
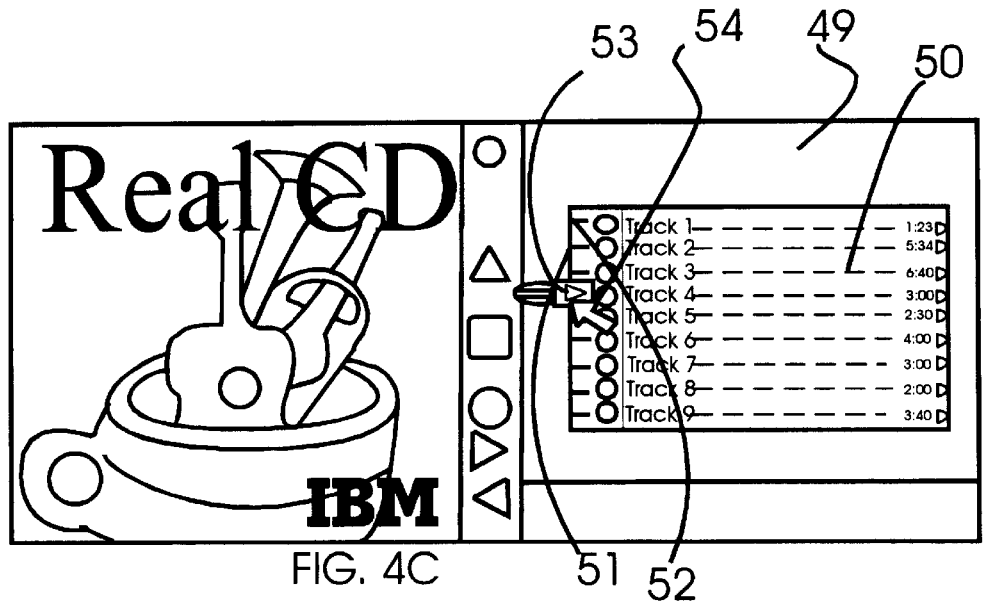
Figure 4D:
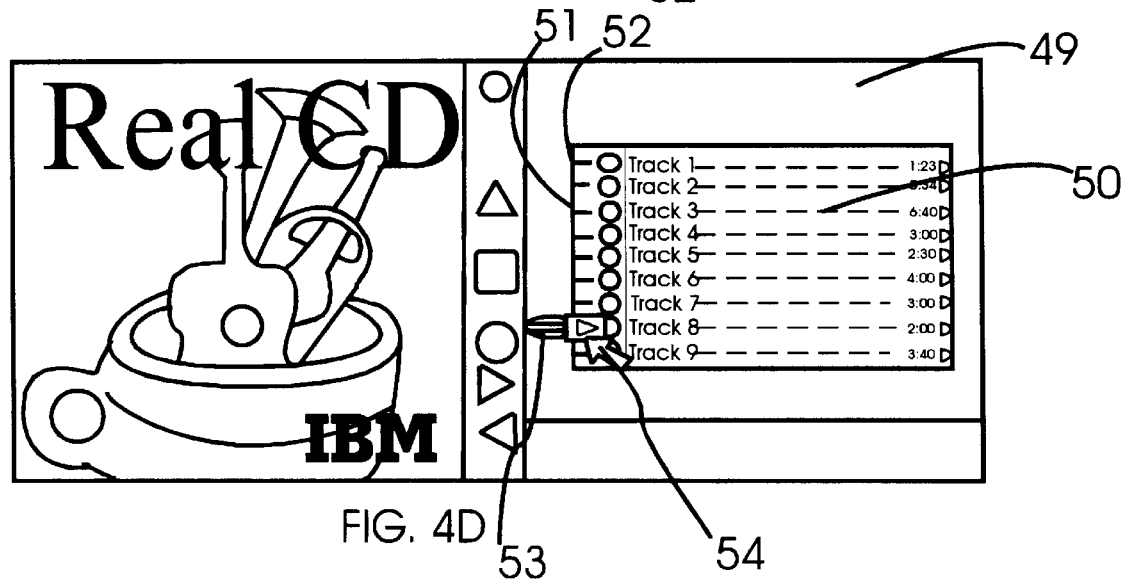

With respect to FIGS. 4A through 4D, let us go through an exercise of directly changing tracks. In FIG. 4A indicator 53 is adjacent to track 1 which indicates that track 1 is currently being presented. The user wishes to switch to track 4. Therefore, he moves the cursor or pointer 54, FIG. 4B, to a position on scale 51 which is adjacent to track 4. When he enters that position, as shown in FIG. 4C, indicator 53 jumps to a position on scale 51 which is adjacent to track 4 and play begins of the musical sequence represented on track 4. In a similar fashion, if the viewer wishes to again change tracks to track 8, he moves cursor or pointer 54 to a position on scale 51 adjacent to track 8 and enters that position at which time the indicator 53 jumps to that position adjacent to track 8 as shown in FIG. 4D. Indicator 53 may also be dragged to its next position by placing the user controlled cursor over it and dragging it to this next position.

While the above illustration has been made with respect to audio tracks or sequences, it should be understood that the present invention of direct access and change is available in accessing segments of other electronic media presentations, e.g. video sequences or sequences of still photographs. In these other areas, the present method may be very effective in editing image sequences particularly video sequences wherein the total video presentation is broken down into a group of sequences for editing purposes. Such sequences may be directly rather than serially accessed, edited and returned or stored again. For example, the above-mentioned copending application entitled "INTERACTIVE DISPLAY INTERFACE FOR MEDIA PRESENTATION HAVING SIMPLIFIED CONTROLS", S. Martin et al. (Attorney Docket No. AT9-97-279), describes the presentation and editing of video as well as still photograph sequences. The present invention would be applicable to control the presentation and editing of such sequences.

Figure 5A:
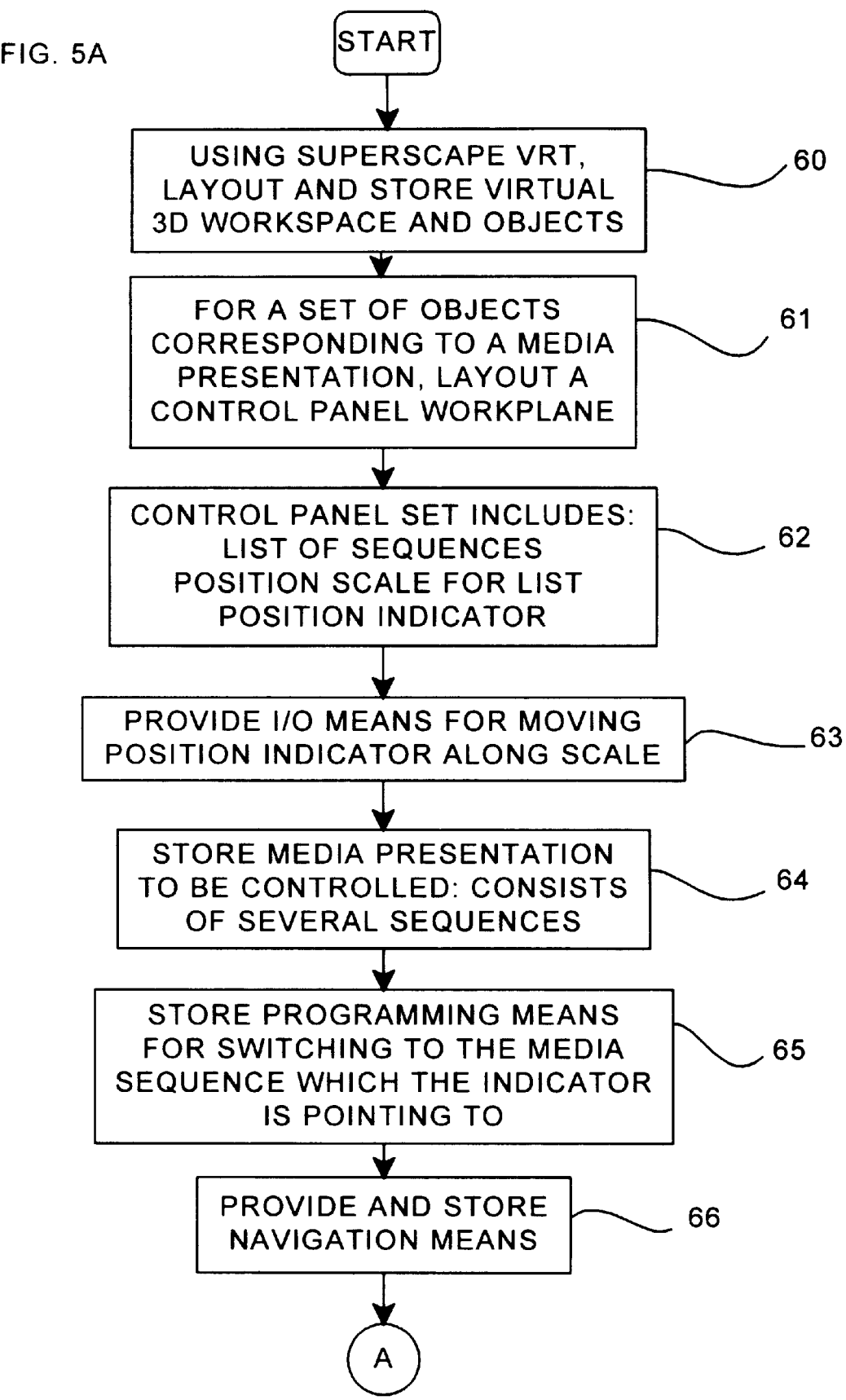
FIGS. 5A and 5B are flowcharts of an embodiment of a process implemented by the present invention for running a presentation under the control system in accordance with the present invention.
Figure 5B:
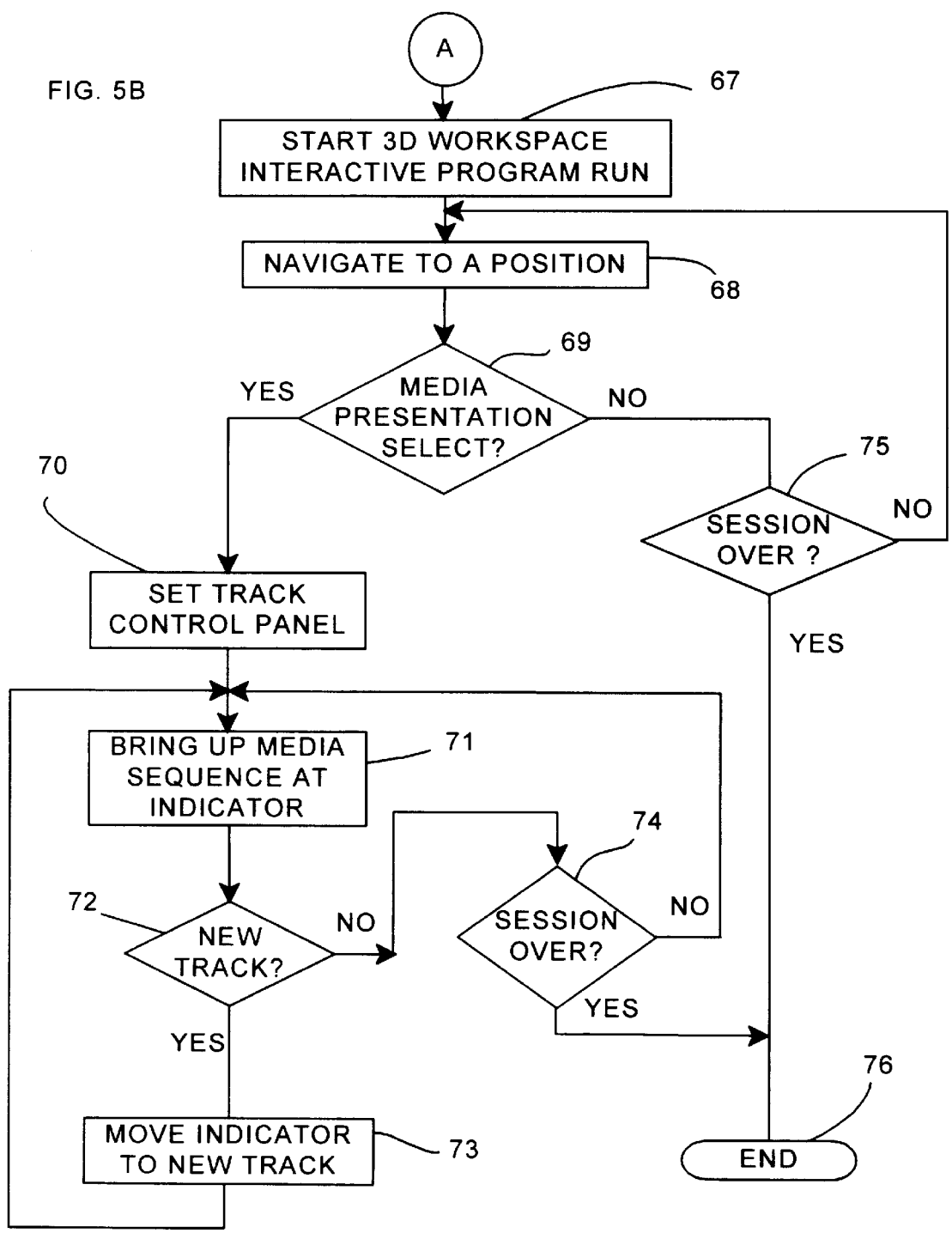

Now with reference to FIGS. 5A and 5B we will describe a process implemented by the present invention in conjunction with the flowcharts of these figures. The flowcharts are in two parts: the steps in FIG. 5A relate to the development of the virtual reality three dimensional workspace and particularly to a set of objects corresponding to media presentations according to the present invention. Within these media presentations, there are used the control panels of the present invention. First, step 60, FIG. 5A, the desired three dimensional workspace is laid out including appropriate objects. For example, this would be workspace 42 in FIG. 2 which would be created and stored. Next, step 61, the objects including objects for the media presentation are set up and stored. This would include the CD control image 45 in FIG. 2 including the control panel 47. Next, step 62, the list of media sequences, the position scale corresponding to the list and the position indicator are set up. Also, step 63, I/O means for moving the position indicator along the scale are set up. This would be the drivers and other linkages connecting mouse 26, FIG. 1 via cursor arrow 54 to move indicator along scale 51, FIGS. 4B and 4C. Then, step 64, media presentations are stored in the system. These would be the CDs on carousel 48 in FIG. 2. Programming means are provided, step 65, for controlling the switching of media sequences when in response to the movement of indicator 53 in FIGS. 4A through D.

Lastly, conventional navigational means are provided, step 66, for changing user viewpoints.

The process now proceeds to point A in FIG. 5B. At this point, the previously created and stored three-dimensional workspace program is run, step 67. Then using the conventional navigation means for changing viewpoints, step 68, the system is navigated to a particular position or viewpoint at which a particular object representative of a media presentation will be available, e.g. the viewpoint in FIG. 2 wherein CD carousel 48 is available. Next, decision step 69, a determination is made whether a media presentation has been selected. For purposes of the present example, let us assume that the user has selected a CD presentation. Then, step 70, the appropriate display interface is set up including the scale tracking control panel of the present invention. The indicator 53, FIG. 4A will be at an initial position. The corresponding audio sequence will be brought up and played, step 71, FIG. 5B. Next, step 72, a determination is made as to whether a new track has been selected, e.g. as by moving pointer 54 in FIG. 4B. If yes, then, step 73, FIG. 5B, the indicator 53 is moved to a new position, and the flow returns to step 71 where the media sequence, e.g. audio track corresponding to this new position is played.

If the decision from decision step 72 is that a new track has not been selected, then a determination is made, decision step 74, as to whether the session is over. If the session is over then the system proceeds to end the session, step 76. If the session is not over, the system then returns to step 71 and the present audio sequence is continued. Going back a few steps to decision step 69 where a determination was made as to whether a media presentation was selected, if a media presentation was not selected, then the system proceeds to decision step 75 where a determination is made as to whether the session is over. If the session is over, then here again the system proceeds to step 76 and the session is ended. On the other hand if the determination from decision step 75 is that the session is not over, then the system returns to step 68 and navigation takes place to a subsequent position.

It should be understood that while the flow charts of FIGS. 5A and 5B have been described with respect to the audio CD embodiment, they could have also been applied to the use of video presentations as well as other electronic media presentations having a plurality of sequences which are desirably directly accessed.

Although certain preferred embodiments have been shown and described, it will be understood that many changes and modifications may be made therein without departing from the scope and intent of the appended claims.

We claim:

1. A computer supported display system for controlling electronic media presentations comprising:

means for storing the content of at least one media presentation having a plurality of media sequences, means for displaying a list of said media sequences, means for displaying in association with said list a graphic scale of positions, each respectively corresponding to a media sequence on said list, user interactive means for directly selecting one of said media sequences by placing a graphical indicator at the position corresponding to said sequence, and means for maintaining said indicator at said corresponding position until another media sequence is selected.

2. The computer supported display system of claim 1 wherein said presentation is a video presentation and said media sequences are video scenes.

3. The computer supported display system of claim 1 wherein said presentation is a photographic presentation and said sequences are sequences of still photographs.

4. The computer supported display system of claim 1 wherein said presentation is an audio presentation and said media sequences are audio sequences.

5. A computer implemented method for controlling electronic media presentations comprising:

storing the content of at least one media presentation having a plurality of media sequences, displaying a list of said media sequences, displaying in association with said list a graphic scale of positions, each respectively corresponding to a media sequence on said list, user interactively selecting one of said media sequences by placing a graphical indicator directly at the position corresponding to said sequence, and maintaining said indicator at said corresponding position until another media sequence is selected.

6. The method of claim 5 wherein said presentation is a video presentation and said media sequences are video scenes.

7. The method of claim 5 wherein said presentation is a photographic presentation and said sequences are sequences of still photographs.

8. The method claim 5 wherein said presentation is an audio presentation and said media sequences are audio sequences.

9. A computer program having data structures included on a computer readable medium which causes a display on a data processor supported display comprising:

means for storing the content of at least one media presentation having a plurality of media sequences, means for displaying a list of said media sequences, means for displaying in association with said list a graphic scale of positions, each respectively corresponding to a media sequence on said list, user interactive means for directly selecting one of said media sequences by placing a graphical indicator at the position corresponding to said sequence, and means for maintaining said indicator at said corresponding position until another media sequence is selected.

10. The computer program according to claim 9 wherein said presentation is a video presentation and said media sequences are video scenes.

11. A computer program according to claim 9 wherein said presentation is a photographic presentation and said sequences are sequences of still photographs.

12. A computer program according to claim 9 wherein said presentation is an audio presentation and said media sequences are audio sequences.

* * * * *